Patented Nov. 24, 1942

2,303,069

UNITED STATES PATENT OFFICE 2,303,069

COMPOSITION CONTAINING ISO-OLEFIN POLYMERS

William J. Sparks, Cranford, and Robert M. Thomas, Union, N. J., assignors, by mesne assignments, to Jasco, Incorporated, a corporation of Louisiana No Drawing. Application July 30, 1938, Serial No. 222,146

3 Claims. (Cl. 260—36)

The present invention relates to improved methods for working hydrocarbon polymers and polymer compositions which are especially desirable for working either by calendering, milling, extrusion or other mechanical means.

Hydrocarbon polymers have been made by subjecting olefins, especially iso olefins such as iso-butylene and iso amylene while in liquid phase to the action of catalysts of the Friedel Crafts type, while at low temperatures. The preferred catalyst is boron fluoride but aluminum chloride, especially dissolved in alkyl halides such as ethyl chloride, zinc chloride, titanium fluoride, and others of the same class may be employed. The temperature during reaction, which is ordinarily quite rapid, must be below $-10°$ C., and much lower temperatures are ordinarily employed, for example, $-40°$ C., $-60°$ C., or even $-100°$ C. The product varies in its properties depending on the conditions of operation, the particular olefin used and the purity thereof, and ranges from a gummy oil having a molecular weight from 500 to 15,000 or 20,000 through a gummy and tacky solid having a molecular weight between about 25,000 and 75,000 or 80,000 up to elastic rubber-like products of 100,000 to 250,000. The molecular weights given above are, of course, approximate and are measured by the Staudinger Viscosity Method. The polymers are substantially saturated and have very low iodine numbers, usually below 10.

In working up these materials, particularly the gummy, solid materials, there is considerable difficulty encountered because the polymers do not gain fluidity at elevated temperatures sufficiently to assist the mechanical operations and at the same time because they lack surface hardness and become extremely tacky and difficult to handle. For these reasons, the polymer has not been readily susceptible to mechanical processes such as extrusion, calendering, milling and other mechanical operations of this type which are ordinarily used to form materials of this type into rods, sheets or other forms.

Attempts have been made to remedy the above difficulties by the addition of compounding agents, and many have been found which are compatible with the particular olefin polymers, but none has been entirely successful in solving the particular problem at hand. Mechanical fillers, such as inorganic oxides, carbonates, chalk, carbon black and the like, can be used to reduce tackiness, but these materials at the same time greatly reduce the flow of the material which is ordinarily too low for practical purposes, especially at high temperatures and such mixtures are difficult to handle by the methods mentioned above. On the other hand, organic blending agents are frequently totally insoluble, especially those containing oxygen in any substantial proportion, and the more readily available oxygen free compounding agents, such as paraffin wax, lubricating oils, or stearic acid and similar acids, esters, gums and the like which have been used were found to be unsuccessful because, while they give the additional fluidity, they do this at the sacrifice of surface hardness. Materials of the two types, that is to say mechanical fillers and organic blending agents, have been used together, but the amounts employed must be large to obtain the properties required for treatment such as milling or extrusion, and many of the valuable properties of the original olefin polymers are lost or are greatly diminished due to the large amounts of inert materials added.

It has now been found that certain materials can be used for this purpose, however, and the best of these materials are solid, crystalline, aromatic hydrocarbons such as naphthalene, phenanthrene or anthracene; in short, the condensed ring aromatic hydrocarbons. These materials are soluble in the polymers when hot, that is to say above the melting point of the particular ingredients, and in this condition greatly increase the fluidity of the product. On the other hand, at lower temperatures the addition agents become solid and acting as solid fillers decrease tackiness of the polymer. Most of these materials give the appearance of complete solubility even at low temperatures and films made of the two ingredients are transparent even in the cold, but it is believed that the materials are not entirely soluble since when the films are stretched, they become turbid or translucent, indicating that the crystalline solids are not completely in solution, but probably in the form of very small crystals. Another type of materials which can be used are the condensation products of aromatic hydrocarbons, for example diphenyl, dinaphthyl, and the like. These materials have the general formula $(C_nH_n)_m$, where $n$ indicates the number of carbon atoms in the unpolymerized ring compound, for example 6, 10, 14 or the like, and $m$ is an integer greater than 1. A third class of materials which is also closely related to those mentioned before are the polymers of aromatic hydrocarbons. These materials while similar to the condensation products are different because they have the same ultimate composition as the aromatic materials from which they are produced and differ from the condensation products which latter contain less hydrogen than the aromatics from which they are derived. As particular examples of the materials of this class may be mentioned dihydro diphenyl $(C_6H_6)_2$ or dihydro dinaphthalene $(C_{10}H_{10})_2$. More generally the formula may be expressed as $(C_nH_n)_m$ in which, as before, the $n$ represents the number of carbon atoms in the initial compound, 6, 10 or 14 or the like, and the $m$ is an integer greater than 1. The materials of the latter class not only include strictly the polymers such as mentioned before, but should also include products such as phenyl-naphthyl compounds, phenyl anthryl or naphthyl anthryl compounds.

Various alkylated materials of the three classes mentioned above may be used, but it should be recalled that the alkylation ordinarily reduces the melting point of the materials and those satisfactory for the present purposes should be those which are crystalline and which are solid at ordinary temperatures. If the material itself is to be used at a more elevated temperature, it is preferable to use a material which will be solid above the temperature of use; in other words, to choose a suitable hydrocarbon compound of the classes described above with a melting point above the temperature at which it is to be employed.

Various other materials may be used in place of the aromatic hydrocarbons, for example, hydrogenated Montan kax or other solid high melting esters such as carnauba wax or candelilla wax and the like. Diphenyl oxide can be employed, as well as the solid hydrogenated aromatics and the more highly chlorinated naphthalenes and solid chlorinated aliphatic compounds such as hexachlorethane.

In carrying out the present invention, the various modifying agents are chosen with regard to service to which the composition is to be put, and a modifying agent is dissolved in the olefin polymer either directly by heating or by addition in a suitable solvent such as benzol, carbon tetrachloride, carbon disulphide or the like. The materials may be kneaded together, milled or otherwise admixed. The amount of the modifying agent naturally varies considerably depending on its specific quality and the degree of modification desired. In many cases as little as 5 or 10% of particular products, such as naphthalene or diphenyl may be used, but more may be employed for example up to 30 or even 50% or more, but in such instances it will be understood that the fundamental nature of the olefin polymers is considerably changed. When using smaller amounts, however, the olefin polymers serve for the same purposes as unblended materials, but they have the advantage that they can be worked by milling, extrusion and the like more readily than the unblended materials.

The nature of the present invention will be more fully understood from the following example:

*Example*

One hundred g. of an isobutylene polymer having a molecular weight by the Staudinger method of about 150,000 was milled with 25 parts of naphthalene for 10 minutes on an unheated laboratory rubber mill. A batch of the polymer alone was treated similarly.

Each of the samples was then pressed on the surface of muslin cloth between 2 brass plates at 12,000 lbs. pressure and 110° C. On removing the sheeted materials from the press and allowing them to cool the uncompounded sample curled very badly and could not be smoothed in to a permanent plot sheet. The treated sample remained flat, could be rolled or folded but readily resumed its original flat form.

We claim:

1. Composition of matter consisting of a gummy, iso-olefin polymer of a molecular weight of 25,000 to 150,000 and 5 to 10% of naphthalene incorporated therewith.

2. Composition of matter comprising a gummy, iso-olefin polymer of a molecular weight of 25,000 to 150,000 and 5 to 10% of diphenyl incorporated therewith.

3. Composition of matter consisting of a gummy iso-olefin polymer having a molecular weight of from 25,000 to 150,000 and from 5 to 10% of a crystalline condensed nuclear aromatic hydrocarbon.

WILLIAM J. SPARKS.
ROBERT M. THOMAS.